(12) United States Patent
Geelen et al.

(10) Patent No.: US 9,086,294 B2
(45) Date of Patent: Jul. 21, 2015

(54) NAVIGATION DEVICE WITH ADAPTIVE NAVIGATION INSTRUCTIONS

(75) Inventors: Pieter Geelen, Amsterdam (NL); Serhiy Tkachenko, Amsterdam (NL); David Stelpstra, Amsterdam (NL); Kees Wesselius, Wormer (NL)

(73) Assignee: TomTom International B.V., Amsterdam (NL)

( * ) Notice: Subject to any disclaimer, the term of this patent is extended or adjusted under 35 U.S.C. 154(b) by 869 days.

(21) Appl. No.: 12/225,730

(22) PCT Filed: Jul. 6, 2006

(86) PCT No.: PCT/NL2006/050167
§ 371 (c)(1),
(2), (4) Date: Sep. 29, 2008

(87) PCT Pub. No.: WO2008/004857
PCT Pub. Date: Jan. 10, 2008

(65) Prior Publication Data
US 2009/0157294 A1     Jun. 18, 2009

(51) Int. Cl.
*G01C 21/36*     (2006.01)
(52) U.S. Cl.
CPC ........ *G01C 21/3641* (2013.01); *G01C 21/3655* (2013.01)
(58) Field of Classification Search
CPC .................................................. G01C 21/3641
USPC ........................................................ 701/424
See application file for complete search history.

(56) References Cited

U.S. PATENT DOCUMENTS

| 5,177,658 | A | 1/1993 | Brenner et al. |
| 6,366,207 | B1 * | 4/2002 | Murphy ........................ 340/576 |
| 6,957,142 | B2 * | 10/2005 | Entenmann .................... 701/117 |
| 7,057,532 | B2 * | 6/2006 | Shafir et al. ................... 340/988 |
| 7,231,285 | B2 * | 6/2007 | Noguchi ...................... 701/33.4 |

(Continued)

FOREIGN PATENT DOCUMENTS

| CN | 1712900 A | 12/2005 |
| DE | 100 61 696 | 6/2002 |

(Continued)

OTHER PUBLICATIONS

PCT/ISA/210.

*Primary Examiner* — Anita Coupe

(57) ABSTRACT

A navigation device is disclosed wherein, in at least one embodiment. navigation instruction are adapted to the driver preferences. The driving behavior of the driver is recorded (like speed, time to prepare for an exit etc.), and the way he responds to navigation instructions (promptly, or always too late for example). Traffic, weather and time information may be combined with information on the driving behavior of the driver. This information is examined and used to build up a driver profile. This driver profile is used to adapt future navigation instructions. Alternatively, traffic and weather information may be used to build up route and/or environmental profiles. These profiles can also be used separate from the driver profile to adjust the navigation instruction. The combination of these two techniques, building up a profile (or adapt a pre-defined profile) and adapt the navigation instructions, makes the navigation device a more personal-fit navigation aid. Also, giving the right instructions to a specific driver may contribute to a safer behavior.

12 Claims, 4 Drawing Sheets

(56) References Cited

U.S. PATENT DOCUMENTS

| | | | |
|---|---|---|---|
| 7,245,741 B1* | 7/2007 | Ertl et al. | 382/103 |
| 7,349,800 B2* | 3/2008 | Forlenza et al. | 701/411 |
| 7,589,643 B2* | 9/2009 | Dagci et al. | 340/905 |
| 7,908,080 B2* | 3/2011 | Rowley et al. | 701/423 |
| 7,991,544 B2* | 8/2011 | Singh | 701/425 |
| 8,068,134 B2* | 11/2011 | Yoshizawa | 348/148 |
| 8,073,618 B2 | 12/2011 | Harumoto et al. | |
| 8,090,598 B2* | 1/2012 | Bauer et al. | 705/4 |
| 8,140,358 B1* | 3/2012 | Ling et al. | 705/4 |
| 2001/0018636 A1* | 8/2001 | Mizuno | 701/207 |
| 2002/0082771 A1* | 6/2002 | Anderson | 701/209 |
| 2003/0146841 A1* | 8/2003 | Koenig | 340/576 |
| 2004/0204846 A1* | 10/2004 | Yano et al. | 701/210 |
| 2005/0137757 A1* | 6/2005 | Phelan et al. | 701/1 |
| 2005/0137795 A1* | 6/2005 | Sakamoto et al. | 701/211 |
| 2005/0143884 A1* | 6/2005 | Bihler et al. | 701/36 |
| 2005/0234617 A1* | 10/2005 | Kynast et al. | 701/36 |
| 2005/0246096 A1 | 11/2005 | Bracht et al. | |
| 2005/0278077 A1* | 12/2005 | Shin et al. | 701/1 |
| 2006/0041378 A1* | 2/2006 | Cheng et al. | 701/211 |
| 2006/0064241 A1* | 3/2006 | Rasmussen et al. | 701/201 |
| 2006/0080034 A1* | 4/2006 | Hayashi | 701/211 |
| 2006/0229802 A1* | 10/2006 | Vertelney et al. | 701/200 |
| 2007/0027583 A1* | 2/2007 | Tamir et al. | 701/1 |
| 2007/0124027 A1* | 5/2007 | Betzitza et al. | 701/1 |
| 2007/0288162 A1* | 12/2007 | Furukawa | 701/210 |
| 2008/0027643 A1* | 1/2008 | Basir et al. | 701/213 |
| 2009/0132109 A1* | 5/2009 | Galley et al. | 701/29 |

FOREIGN PATENT DOCUMENTS

| | | |
|---|---|---|
| EP | 1 530 025 | 5/2005 |
| EP | 0 973 011 | 3/2008 |
| JP | 7198401 A | 8/1995 |
| JP | 8077491 A | 3/1996 |
| JP | 2000046577 A | 2/2000 |
| JP | 2000283771 A | 10/2000 |
| JP | 2000283780 A | 10/2000 |
| JP | 2001188992 A | 7/2001 |
| JP | 2001280990 A | 10/2001 |
| JP | 2002286485 A | 10/2002 |
| JP | 2003022498 A | 1/2003 |
| JP | 2004301547 A | 10/2004 |
| JP | 2004333467 A | 11/2004 |
| JP | 2005098749 A | 4/2005 |
| JP | 2006047231 A | 2/2006 |
| JP | 2006064563 A | 3/2006 |
| JP | 2006184007 A | 7/2006 |
| JP | 2007263903 A | 10/2007 |
| TW | 200502116 A | 1/2005 |

\* cited by examiner

NAVIGATION DEVICE WITH ADAPTIVE NAVIGATION INSTRUCTIONS

TECHNICAL FIELD

The present invention relates to a navigation device giving navigation instructions to a user depending on a recorded profile.

STATE OF THE ART

Prior art navigation devices based on GPS (Global Positioning System) are well known and are widely employed as in-car navigation systems. Such a GPS based navigation device relates to a computing device which in a functional connection to an external (or internal) GPS receiver is capable of determining its global position. Moreover, the computing device is capable of determining a route between start and destination addresses, which can be input by a user of the computing device. Typically, the computing device is enabled by software for computing a "best" or "optimum" route between the start and destination address locations from a map database. A "best" or "optimum" route is determined on the basis of predetermined criteria and need not necessarily be the fastest or shortest route. It may also be a preferred route determined on the basis of previous routes driven.

The navigation device may typically be mounted on the dashboard of a vehicle, but may also be formed as part of an on-board computer of the vehicle or car radio. The navigation device may also be (part of) a hand-held system, such as a PDA or telephone.

By using positional information derived from the GPS receiver, the computing device can determine at regular intervals its position and can display the current position of the vehicle to the user. The navigation device may also comprise memory devices for storing map data and a display for displaying a selected portion of the map data.

Also, it can provide instructions how to navigate the determined route by appropriate navigation directions displayed on the display and/or generated as audible signals from a speaker (e.g. 'turn left in 100 m'). Graphics depicting the actions to be accomplished (e.g. a left arrow indicating a left turn ahead) can be displayed in a status bar and also be superimposed upon the applicable junctions/turnings etc. in the map itself.

It is known to enable in-car navigation systems to allow the driver, whilst driving in a car along a route calculated by the navigation system, to initiate a route re-calculation. This is useful where the vehicle is faced with construction work or heavy congestion.

It is also known to enable a user to choose the kind of route calculation algorithm deployed by the navigation device, selecting for example from a 'Normal' mode and a 'Fast' mode (which calculates the route in the shortest time, but does not explore as many alternative routes as the Normal mode).

It is also known to allow a route to be calculated with user defined criteria; for example, the user may prefer a scenic route to be calculated by the device. The device software would then calculate various routes and weigh more favourably those that include along their route the highest number of points of interest (known as POIs) tagged as being for example of scenic beauty.

Patent application EP 1 530 025 A2 discloses a vehicle navigation system that is capable of learning user habits/preferences. The vehicle navigation system monitors a driver's habits and updates a database to thereby cause the vehicle navigation system to have a preference for the driver's habits so that the navigation system is more in tune with what routes particular drivers desire when travelling to certain destinations. The navigation system comprises a special artificial intelligence (AI) module arranged to monitor the driver habits. The main reason for the tuning to the drivers desires is to avoid annoyance of the user. However, directing a driver into an undesired direction is only one cause for the annoyance of the driver.

Another even more important cause for annoyance is the way in which the instructions are given. If for example, the navigation device tells the driver to "go left at the next crossing", this may already be annoying for a driver that is very familiar with that crossing. This cause of annoyance can not be prevented by present navigation devices.

SHORT DESCRIPTION

So, it is desirable to provide a navigation device which gives navigation instructions that reduce the chance of annoyance of the user.

Therefore, according to an aspect of the claimed invention, there is provided a navigation device arranged to give navigation instructions to a driver of a vehicle, wherein the device comprises:
 a route calculation module that is arranged to determine a route from an origin to a destination;
 an instructions module arranged to produce a set of base instructions for the driver so as to enable the driver to go the determined route, and
 a profile module arranged to build up at least one profile, characterized in that the navigation device comprises:
 a profile-to-instruction translator arranged to convert the set of base instructions into a set of output instructions depending on said at least one profile.

The profile may for example comprise a so-called driver profile in which parameters are stored which reflect preferences, properties or habits of the driver. Depending on recorded values for these parameters, the navigation device will convert the base instruction into output instructions given to the driver. Because a driver profile is built up and will change over time, sometimes certain base instructions are converted in a different way than at other times. The varying of the output instructions is also referred to as 'adapting' the instructions. The combination of two techniques, i.e. building up a profile and adapting the navigation instructions, makes the navigation device according to the invention a more personal-fit navigation aid. Also, giving the right instructions to a specific driver may contribute to a safer behaviour.

In another aspect of the invention, there is provided a method for providing navigation directions using a navigation device, the method comprising:
 determine a route from an origin to a destination;
 produce a set of base instructions for a user so as to enable the user to go the determined route, and
 build up at least one profile,
characterized by converting the set of base instructions into a set of output instructions depending on said at least one profile.

In another aspect, there is provided a computer program, when loaded on a computer arrangement, giving the computer arrangement the ability to perform the method described above.

Finally, there is provided a data carrier, comprising the computer program mentioned above.

SHORT DESCRIPTION OF THE DRAWINGS

Embodiments of the invention will now be described, by way of example only, with reference to the accompanying schematic drawings in which corresponding reference symbols indicate corresponding parts, and in which:

FIG. 1 schematically depicts a schematic block diagram of a navigation device according to an embodiment, FIG. 2 schematically depicts a schematic view of a navigation device, FIG. 3 shows a car comprising the navigation device according to an embodiment;

FIG. 4 schematically shows a diagram of the modules in the navigation device according to an embodiment;

DETAILED DESCRIPTION

Figure 1:
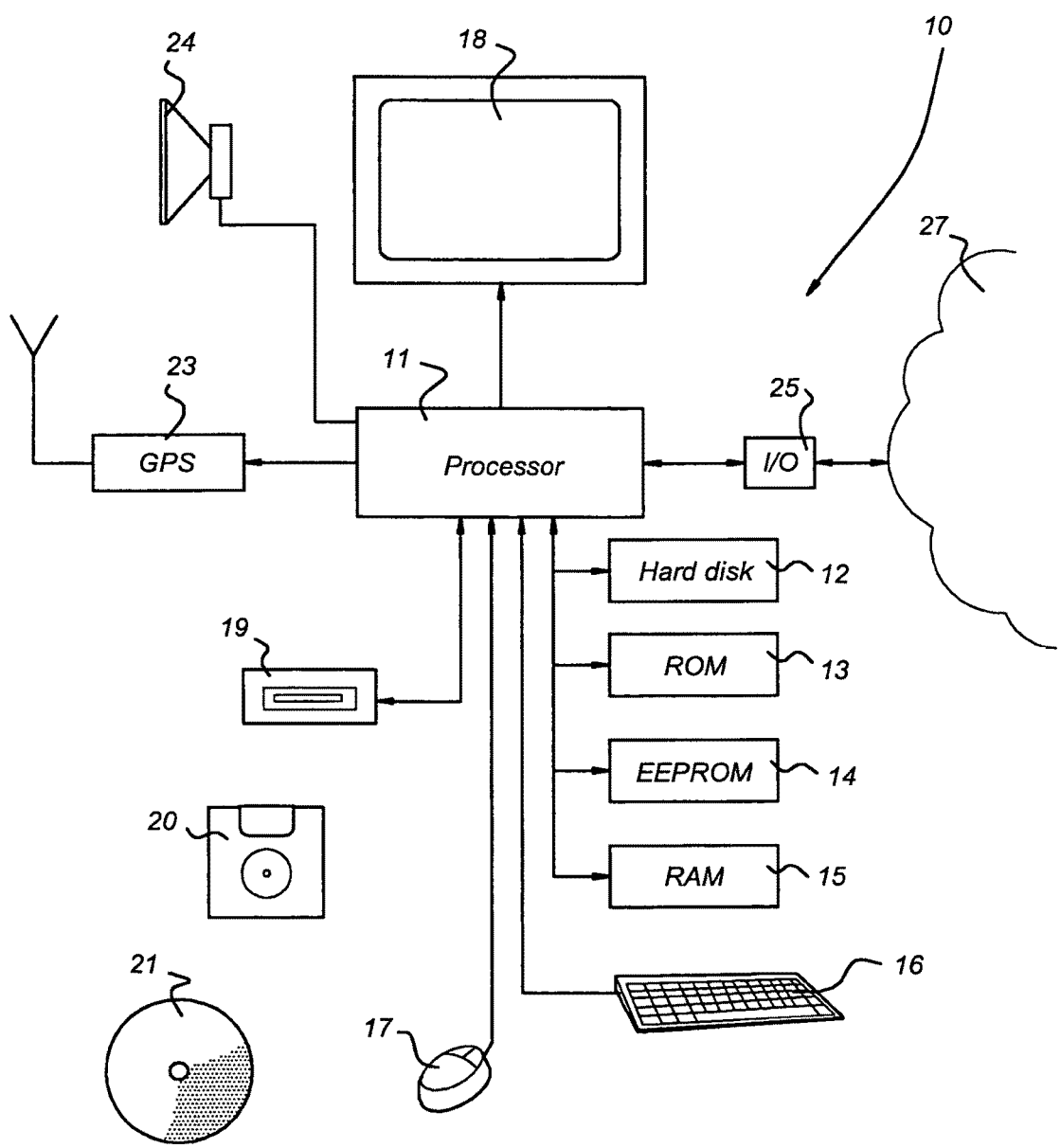

FIG. 1 shows a schematic block diagram of an embodiment of a navigation device 10, comprising a processor unit 11 for performing arithmetical operations. The processor unit 11 is arranged to communicate with memory units that store instructions and data, such as a hard disk 12, a Read Only Memory (ROM) 13, Electrically Erasable Programmable Read Only Memory (EEPROM) 14 and a Random Access Memory (RAM) 15. The memory units may comprise map data. This map data may be two dimensional map data (latitude and longitude), but may also comprise a third dimension (height). The map data may further comprise additional information such as information about petrol/gas stations, points of interest. The map data may also comprise information about the shape of buildings and objects along the road.

The processor unit 11 may also be arranged to communicate with one or more input devices, such as a keyboard 16 and a mouse 17. The keyboard 16 may for instance be a virtual keyboard, provided on a display 18, being a touch screen. The processor unit 11 may further be arranged to communicate with one or more output devices, such as a display 18, a speaker 24 and one or more reading units 19 to read for instance floppy disks 20 or CD ROM's 21. The display 18 could be a conventional computer display (e.g. LCD) or could be a projection type display, such as the head up type display used to project instrumentation data onto a car windscreen or windshield. The display 18 may also be a display arranged to function as a touch screen, which allows the user to input instructions and/or information by touching the display 18 with his finger.

The speaker 24 may be formed as part of the navigation device 10. In case the navigation device 10 is used as an in-car navigation device, the navigation device 10 may use speakers of the car radio, the board computer and the like.

The processor unit 11 may further be arranged to communicate with a positioning device 23, such as a GPS receiver, that provides information about the position of the navigation device 10. According to this embodiment, the positioning device 23 is a GPS based positioning device 23. However, it will be understood that the navigation device 10 may implement any kind of positioning sensing technology and is not limited to GPS. It can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographical location.

However, it should be understood that there may be provided more and/or other memory units, input devices and read devices known to persons skilled in the art. Moreover, one or more of them may be physically located remote from the processor unit 11, if required. The processor unit 11 is shown as one box, however, it may comprise several processing units functioning in parallel or controlled by one main processor that may be located remote from one another, as is known to persons skilled in the art.

The navigation device 10 is shown as a computer system, but can be any signal processing system with analog and/or digital and/or software technology arranged to perform the functions discussed here. It will be understood that although the navigation device 10 is shown in FIG. 1 as a plurality of components, the navigation device 10 may be formed as a single device.

The navigation device 10 may use navigation software, such as navigation software from TomTom B.V. called Navigator. Navigator software may run on a touch screen (i.e. stylus controlled) Pocket PC powered PDA device, such as the Compaq iPaq, as well as devices that have an integral GPS receiver 23. The combined PDA and GPS receiver system is designed to be used as an in-vehicle navigation system. The embodiments may also be implemented in any other arrangement of navigation device 10, such as one with an integral GPS receiver/computer/display, or a device designed for non-vehicle use (e.g. for walkers) or vehicles other than cars (e.g. aircraft).

Figure 2:
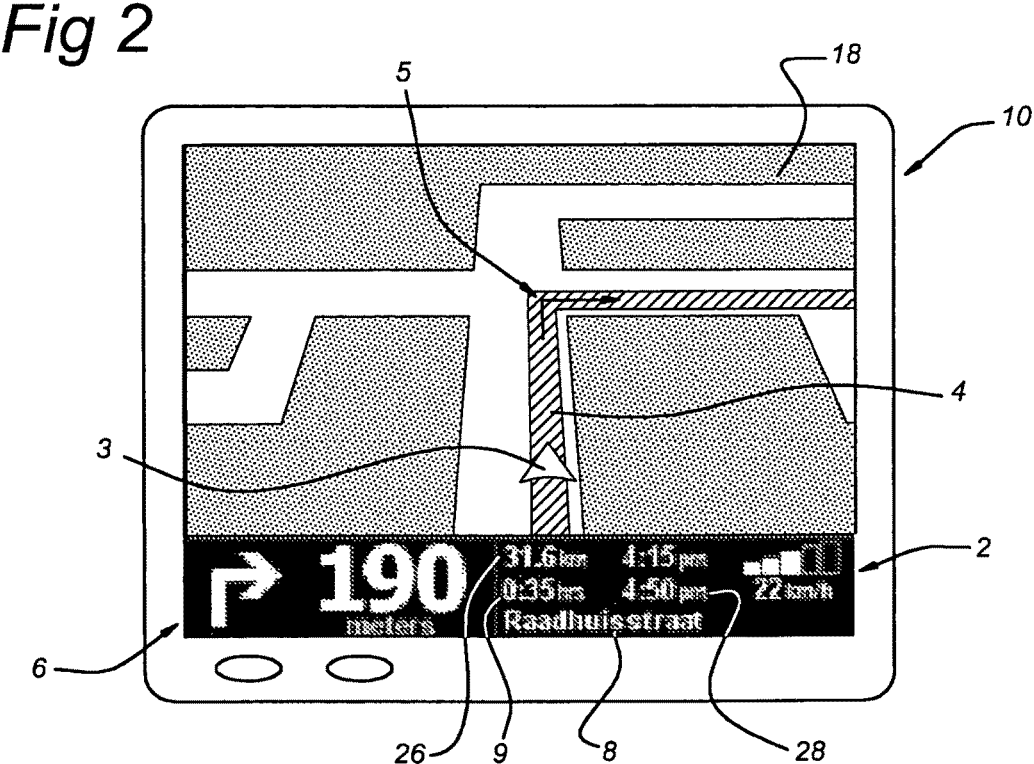

FIG. 2 depicts an example of a functioning display 18 of the navigation device 10 as described above.

Navigator software, when running on the navigation device 10, causes a navigation device 10 to display a normal navigation mode screen at the display 18, as shown in FIG. 2. This view may provide driving instructions using a combination of text, symbols, voice guidance and a moving map. Key user interface elements are the following: a 3-D map occupies most of the screen. It is noted that the map may also be shown as a 2-D map.

The map shows the position of the navigation device 10 and its immediate surroundings, rotated in such a way that the direction in which the navigation device 10 is moving is always "up". Running across the bottom quarter of the screen may be a status bar 2. The current location of the navigation device 10 (as the navigation device 10 itself determines using conventional GPS location finding) and its orientation (as inferred from its direction of travel) is depicted by a position arrow 3. A route 4 calculated by the device (using route calculation algorithms stored in memory devices 11, 12, 13, 14, 15 as applied to map data stored in a map database in memory devices 11, 12, 13, 14, 15) is shown as darkened path. On the route 4, all major actions (e.g. turning corners, crossroads, roundabouts etc.) are schematically depicted by arrows 5 overlaying the route 4. The status bar 2 also includes at its left hand side a schematic icon depicting the next action 6 (here, a right turn). The status bar 2 also shows the distance to the next action (i.e. the right turn—here the distance is 190 meters) as extracted from a database of the entire route calculated by the device (i.e. a list of all roads and related actions defining the route to be taken). Status bar 2 also shows the name of the current road 8, the estimated time before arrival 9 (here 35 minutes), the actual estimated arrival time 28 (4.50 pm) and the distance to the destination 29 (31.6 Km). The status bar 2 may further show additional information, such as GPS signal strength in a mobile-phone style signal strength indicator.

As already mentioned above, the navigation device 10 may comprise input devices, such as a touch screen, that allows the users to call up a navigation menu (not shown). From this menu, other navigation functions can be initiated or controlled. Allowing navigation functions to be selected from a menu screen that is itself very readily called up (e.g. one step away from the map display to the menu screen) greatly simplifies the user interaction and makes it faster and easier. The navigation menu includes the option for the user to input a destination.

The actual physical structure of the navigation device 10 itself may be fundamentally no different from any conventional handheld computer, other than the integral GPS receiver 23 or a GPS data feed from an external GPS receiver. Hence, memory devices 12, 13, 14, 15 store the route calculation algorithms, map database and user interface software; a processor unit 12 interprets and processes user input (e.g. using a touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his required destination into the navigation software running on the navigation device 10, using the input devices provided, such as a touch screen 18, keyboard 16 etc. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

The navigation device 10 may further comprise an input-output device 25 that allows the navigation device 10 to communicate with remote systems, such as other navigation devices 10, personal computers, servers etc., via network 27. The network 27 may be any type of network 27, such as a LAN, WAN, Blue tooth, internet, intranet and the like. The communication may be wired or wireless. A wireless communication link may for instance use RF-signals (radio frequency) and a RF-network.

Figure 3:
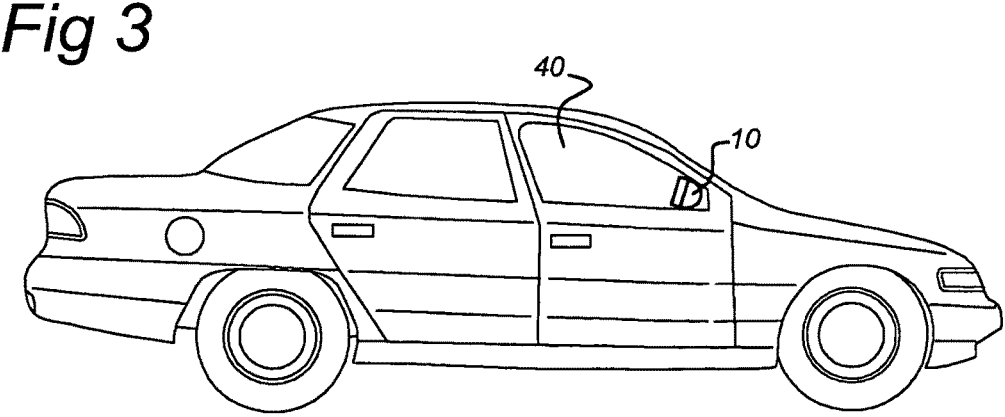

The invention also relates to a vehicle 40, such as a car, comprising the navigation device 10 described above, see FIG. 3. The navigation device 10 may for example be integrated into a dashboard of the car 40 or mounted onto a front window.

Roads themselves are described in the map database that is part of navigation software (or is otherwise accessed by it) running on the navigation device 10 as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the navigation software. The algorithms are applied to score large numbers of potential different routes. The navigation software then evaluates them against the user defined criteria (or device defaults), such as a full mode scan, with scenic route, past museums, and no speed camera. The route which best meets the defined criteria is then calculated by the processor unit 11 and then stored in a database in the memory devices 12, 13, 14, 15 as a sequence of vectors, road names and actions to be done at vector end-points (e.g. corresponding to pre-determined distances along each road of the route, such as after 100 meters, turn left into street x).

In order to reduce the chance of annoyance, the navigation device 10 according to the invention gives more appropriate navigation instructions than present navigation devices. To do this, the navigation device 10 collects data about the driver and uses this data to give the proper instructions. How data is collected and used is described below with reference to FIGS. 4-7.

Figure 4:
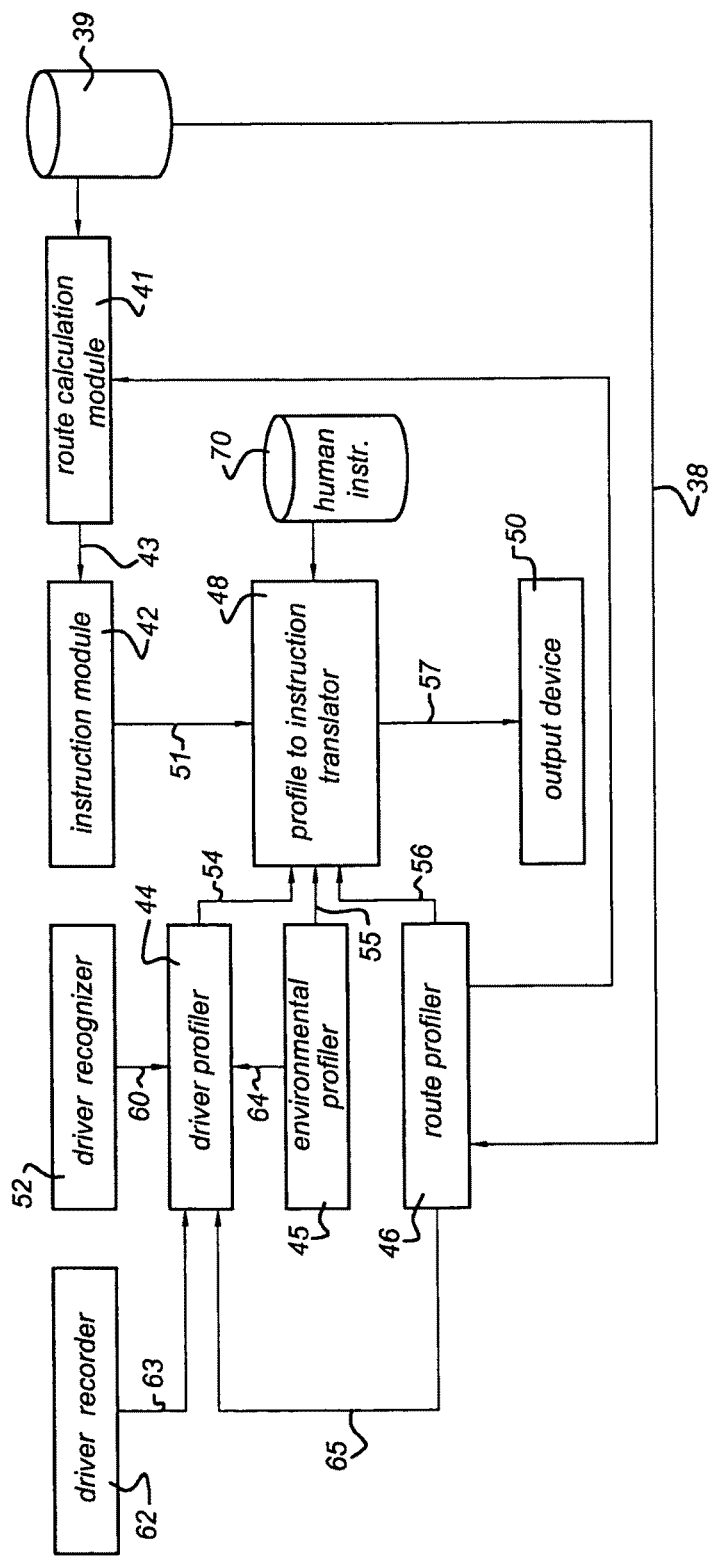

FIG. 4 schematically shows several modules comprised in the navigation device 10, according to an embodiment of the invention. In this embodiment, the navigation device 10 comprises a route calculation module 41 arranged to determine a route from an origin to a destination using map data out of a map database 39, and information entered by the user. Furthermore, a instruction module 42 is provided receiving input from the route calculation module 41, see arrow 43, and arranged to produce a set of base instructions so as to enable the user to go the determined route. An example of a base instruction is "20 m RIGHT" meaning that after 20 meters, the driver has to turn right.

Also one or more profile modules are provided which are arranged to build up one or more profiles as will be discussed in more detail below. In this embodiment, the profile modules comprise a driver profiler 44 building up a driver profile, an environmental profiler 45 building up a environmental profile and a route profiler 46 building up a route profile. The respective profiles are stored into e.g. the memory device 12. A profile-to-instruction translator 48 is provided that receives the set of base instructions, see arrow 51, produced by the instruction module 42 and reads one or more of the profiles out of the memory device 12. The profile-to-instruction translator 48 has access to a human instruction database 70 in which possible human instructions are stored. An example of a human instruction is "turn right" or "make a U-turn".

The navigation device 10 also comprises an output device 50 which receives output instructions, see arrow 57, from the profile-to-instruction translator 48. The output device 50 may comprise the speaker 24 or the screen 18 shown in FIG. 1, or any other suitable output device.

The navigation device 10 may also comprise a driver recognizer 52 which is arranged to recognize a driver sitting behind a wheel of the car 40. Once the navigation device 10 is turned on, the driver recognizer 52 recognizes the driver and an ID of the user, see arrow 60, will be forwarded to the driver profiler 44. The driver may be recognized using different techniques. The user may for example be recognized by his name selected on the touch screen 18. He may also be recognized by way of his mobile phone number transmitted to the navigation device 10 by the phone. It should be clear to the skilled person that other means are possible, e.g. car key, wireless tagged chip, etc.

Also a driver recorder 62 is provided which is arranged to record so-called driving behaviour parameters that reflect a driving behaviour of the driver. Recorded values of these driving behaviour parameters, see arrow 63, are transmitted to the driver profiler 44. The driver recorder 62 is arranged to continuously collect data about the driving behaviour of the driver. The driver profiler 44 will use the driving behaviour parameters to build up a driver profile or amend an active driver profile. The driving behaviour parameters can be collected even without having a route programmed.

Possible driving behaviour parameters that may be recorded and transmitted to the driver profiler 44 in order to build up the driver profile are:

1. acceleration factor: this is a moving average of the acceleration of the vehicle, in [m/s$^2$] divided by a predefined maximum acceleration,
2. deceleration factor: this is a moving average of the deceleration in [m/s$^2$] of the vehicle for brake factor, in [m/s$^2$] divided by a predefined maximum deceleration,
3. curve aggression factor: this is a moving average of the curve acceleration during a curve in [m/s$^2$] divided by a predefined maximum curve acceleration,
4. number of times the driver is driving in a particular administrative area (e.g. Paris, hometown, work location).

Once the driver is recognized by means of the driver recognizer 52, the driver profiler 44 will read the corresponding driver profile out of the memory device 12. If a driver is using the navigation device 10 for the first time, the driver profiler 44 will build a complete new driver profile or will adjust a preset profile already stored in the navigation device 10. The driver profiler 44 may have the possibility to store driver profiles for a number of drivers and it may provide either an automated or a manual possibility to switch among them. The driver profile may be stored in separate files or in a database structure, giving the possibility to address an individual driver profile by giving a corresponding user index. As the driver profile can contain personal related data, such as a wireless tag ID, mobile phone number or ID, or a different personal indication to uniquely select a user, such as fingerprint or password, a driver profile can be addressed by this data also. In an embodiment, the user may have the possibility to identify himself manually by selecting his profile from a list, shown on the screen 18.

The driver profile may comprise one or more of the following driver parameters which have values between for example 0-100:
 A. home address,
 B. driver ID,
 C. date of birth,
 D. number of times an administrative area has been visited,
 E. percentage of exits ignored by the driver: 0 . . . 100,
 F. driver mistakes left for right: 0 . . . 100,
 G. degree of aggression: 0 . . . 100,
 H. mobile phone number,
 I. driver is making a phone call right now: 0 (NO) or 100 (YES),
 J. difficulty level of the driving conditions 0 . . . 100,
 K. driver does not want navigation instructions in his own home location (or any recent destination: 0 . . . 100,
 L. drivers susceptibility to the current day of week: 0 . . . 100,
 M. drivers susceptibility to the time of day: 0 . . . 100.

The following explanation will describe how the driver parameter values may be determined or calculated.
 A. home address: street, city, and country manually entered,
 B. driver ID: name or number or a personal code,
 C. date of birth: manually entered by the driver,
 D. number of times an administrative area has been visited: a plurality of predefined areas, such as cities is stored in memory and a counter is incremented each time the driver drives in one of the predefined areas,
 E. percentage of exits ignored by the driver: 100*moving average of number of forgotten exits/total number of exits in a programmed route,
 F. percentage of turns where driver mistook left for right or vice versa: moving average of 100*number of times a left or a right turn instruction was misinterpreted by the driver/total number of turns during a sliding window of a predefined number of driving hours (preset to 100 hours),
 G. degree of aggression: 100*(curve aggression factor+acceleration factor+deceleration factor)/3,
 H. mobile phone number: entered manually or read from the mobile phone,
 I. driver is making a phone call at the moment an output instruction is planned: if a phone connection is active, an SMS is read or read aloud, or any other remote human communication is detected by the system, this value is 100, else 0,
 J. difficulty level of the driving conditions: (precipitation factor+wind factor+road condition factor+traffic factor)/4 wherein the precipitation factor is 0 (dry), 20 (rain), 60 (hail) or 80 (snow), and the wind factor=0 is a linear function of the amount of Bft where 0 Bft and 100=8 Bft. or more, and the road condition factor is 0 (dry), 50 (wet), 100 (slippery), and the traffic factor is 0 (easy), 40 (average), 70 (busy), 100 (stuck),
 K. driver does not want navigation instructions in his own home location (or any recent destination): this parameter is set initially to 0 for each planned destination. Then, every time a route is driven from or to this destination, it is increased by 5 until it finally reached 100. However, the value may be decreased by 1 for every day the driver did not drive from or to this destination. As a result, the value can reach and stay at 0 over time,
 L. drivers susceptibility to the current day of the week: An "event" is every occasion when a driver's route differs from the programmed route. The relative variance (standard variance, divided by the average) of the event in correlation with the day of week is calculated as $$100 \cdot \frac{\sqrt{\frac{\sum (X-M)^2}{N-1}}}{M \cdot 2.65}$$

In this example, X represents the number of events per day, M is the average of all weekdays, N=the number of weekdays (7).
If the variance of the events is equally divided over the days of the week, then this factor=0. If the driver would only makes mistakes on Monday, this factor=100. If the driver makes only errors on Mondays and Tuesdays, this value will be 64. The factor 2.65 is only a scaling factor.
 M. drivers susceptibility to the time of day: the same formula as mentioned in G is used, where X represents the number of events per quarter day morning, afternoon, evening, night), M is the average of all day quarters, N=the number of day quarters (4). If the variance of the events is equally divided over the mornings, afternoons, evenings and nights, then this factor=0. If the driver would only makes mistakes during the night, this factor=100. If the driver makes only errors on mornings and nights, this value will be 64.

The environmental profiler 45 depicted in FIG. 4, continuously samples possible relevant environmental data, referred to as environment parameters. Possible environment parameters and their values are:
 A. road conditions on a track, value: (dry, wet, slippery),
 B. weather conditions, value: (dry/rain/hail/snow) and (wind 0-100) (100 is 8 Bft. or more),
 C. daylight, value: (light, twilight, dark),
 D. time of day, value: (morning, afternoon, evening, night), E. season, value: (spring, summer, autumn, winter),
F. day of the week, value: 0-6.

The road conditions and the weather conditions may for example be received from a remote server, and the daylight information may for example be determined using the geographical location of the navigation device 10 and/or by means of a light sensor. The time of day, season and day of week can be deducted from the present time determined by an internal clock, not shown, of the navigation device 10.

The route profiler 46 is arranged to continuously sample possible relevant route data, referred to as route parameters. Possible route parameters and their values are:
1. traffic conditions on a track, value: (easy, average, busy, stuck)
2. road type, value (highways, secondary roads, city driving)

The traffic conditions may for example be read from a remote server or a traffic data receiver, and the road type may be read from the map database 39, see arrow 38.

Once the driver has programmed a route, every time the driver ignores a navigation instruction or spontaneously diverts its course off-route, the driver profiler 44 may record one or more of the following 'navigation response parameters':
1. the importance of missing the instruction, this value may be calculated using the additional distance to get back on the route,
2. the number of times (percentage) the driver actually turns around when told after ignoring the navigation instruction,
3. the GPS location and actual course plus original course. These will be sent to a remote server. If many drivers have the same problem at the specific location, the map data might be incorrect. The remote server can store this into a database system. After manual or automatic inspection of the entries in the database system, a conclusion may be made that the map database for this GPS location has defects, or the map database has other shortcomings. The server can reply to the navigation device 10 with a message, that a certain GPS location has to be ignored in such a way that no update of the driver profile may be performed when the driver fails to follow instructions until the map data is replaced by a new version.
4. the current instruction voice volume, value 0-100
5. number of times the instruction "turn around when possible" is given
6. speed (v) in [m/s] from the GPS receiver and/or wheel/gear sensor(s)
7. actual distance to the home location of the driver
8. left driving when used to right driving at home location or v.v. [yes/no]
9. number of mistakes the driver makes when he goes left when instruction said "right" and v.v.
10. number of times a highway exit is missed
11. number of times a street (left/right) is missed
12. number of spontaneous diversions (left or right without an instruction):
13. GPS coverage and precision at the moment the instruction is ignored, value: 0=no data, 100=perfect.

In an embodiment, events wherein the driver ignores an instructions are recorded and accompanied by additional data, such as a timestamp and the location. The navigation device 10 is arranged to create and store a "list of confusing locations" where the driver may be confused by the actual situation or by possible map data errors. The list of confusing locations may be automatically cleaned in such a way that only events, younger than 1 year will be kept. This list is consulted every time the driver drives a route. Should a driver drive at such a listed location, then navigation instructions are adapted to avoid further mistakes, based on the number of times this location was listed. The number of times the driver made a mistake at this location needs to be >=2. If so, the driver may need adapted instructions. In an embodiment, the driver parameters "percentage of exits ignored by the driver" and "percentage of turns where driver mistook left for right or vice versa" will be temporarily multiplied by 2 during the period the driver is closer than 1 km to a location in the list of confusing locations. By increasing the value of these two driver parameters, the profile of the drivers is changed into a profile of a "more insecure" driver which needs more output instructions.

The driver profiler 44 according to an embodiment is arranged to build up the driver profile using one or more of the driving behaviour parameters and the navigation response parameters described above. The built-up driver profile is then sent to the profile-to-instruction translator 48 which will convert the produced set of base instructions depending on the driver profile as will be explained later on.

According to another embodiment, the navigation device 10 does not comprise the driver profiler 44 but instead only comprises the environmental profiler 45 which builds up an environmental profile. An example of such a environment profile and its parameters is:
A. road conditions on a track, value: (dry, wet, slippery)
B. weather conditions, value: (dry, rain, hail, snow), also (wind strength in Bft. 0=still, 100=Bft 8 or more)
C. daylight, value: (light, twilight, dark)
D. time of day, value: (morning, afternoon, evening, night)
E. season, value: (spring, summer, autumn, winter)
F. day of the week, value: 0=Sunday through 6=Saturday Note that this environment profile is made up by the environmental parameters already discussed above. The environment profile will be sent tot the profile-to-instruction translator 48, see arrow 55 in FIG. 4, which will use the environmental profile to convert the base instructions.

In yet another embodiment, only a route profile is built up and sent to the profile-to-instruction translator 48 by the route profiler 46. An example of a route profile comprises all route parameters described above:
A. traffic conditions on a track, value: (easy, average, busy, stuck)
B. road type, value (highways, secondary roads, city driving)

According to a preferred embodiment, the driver profiler 44 receives environmental parameter values from the environmental profiler 45, see arrow 64 and route parameter values from the route profiler 46, see arrow 65. By combining for example the environmental parameters with the driving behaviour parameters, the driver profiler 44 is able to "see" why the driver acts in a certain way. For example, if the weather conditions are extreme and the driver is driving very slowly on a highway, it does not make sense to adapt the current driver profile in such a way that the profile is changed into a "smooth driver" profile. In such situations the driver profile is not amended and kept clean. The additional environmental parameters can also be used to see how the driver reacts on external impulses, like rain etc. and store this information into the driver profile.

The route profiler 46 is arranged to sample traffic conditions by reading for example data from a remote server or a traffic data receiver. The traffic conditions may as well be transmitted to the route calculation module 41, see arrow 66 in FIG. 4. The traffic conditions 66 can be used to recalculate a route taking into account traffic jams and so on, as will be known to the skilled person.

According to an embodiment, the profile-to-instruction translator 48 will consult the profiles stored in memory, and will convert the base instructions into K output instructions, where K=0, 1, 2, 3. It is also possible to play an extra sound in situations where this is appropriate according to the current profiles, such as an alarm sound when the driver needs to take an exit while he is having a phone conversation.

In another embodiment, the profile-to-instruction translator 48 is arranged to delete an instruction of the standard set of instructions. For example, the warning that the present track is a 50 km/h track is not needed for a driver very familiar with this track that is also not an aggressive driver.

In yet another embodiment, the profile-to-instruction translator 48 is arranged to change an output instruction. The profile-to-instruction translator 48 may for example change a voice used to utter the output instruction, or change a volume used to utter the output instruction. Furthermore, it may be possible to change a timing of the output instruction. Navigation instructions can be given earlier or later than defined in the standard set of instructions 51. This may be useful in situations wherein traffic is very busy and it is almost impossible to change lanes. In such cases, drivers may receive earlier instructions. The distance between a point at which the instruction is given and a point of the route associated with the instruction may also be changed depending on the profiles. For example, if the weather is bad and/or if the driver is not experienced, certain instruction may be given further before a particular crossing or exit. The way a particular instruction is given may also be changed. An instruction like "go left" may be changed into "you should really go left" for a driver profile that indicated that the driver is not only prone to ignore or forgetting highway exit instructions, but also needs more attention, as he is driving in a new neighbourhood. The voice used to utter the instruction may also be changed from male to female, or v.v. in cases wherein the profile indicates that more attention is needed, such as drivers that drive aggressive can be slowed down by a female voice. Further, according to yet another embodiment, the intonation of the voice used is changed. A more friendly or aggressive tone when the drives seems susceptible to the time of day or day of week. A more aggressive voice may be useful when previous extra instructions did not have enough effect, because the driver missed an exit again, or when the cost to solve the route diversion is relatively high. Alternatively, the volume of the instruction(s) may be changed. If an exit is missed recently and the volume is relatively low, the volume may be made louder. If the driver forgets exits, extra instructions and sounds may be created on important exits. For those missed exits that are costly, i.e. need relatively many kilometres to correct, the instructions may be different (e.g. louder) than for other less costly exits. If the driver is not aggressive and it appears that the driver will follow the instruction (such as a driver that drives often in the neighbourhood), the spoken instructions may be skipped. If the driver has been driving a lot in his own home location area, pre-announcements (ahead, take left, then take right) may be suppressed, then suppress all announcements, ahead, take left), then suppress all spoken instructions.

If the driver is in difficult driving conditions (e.g. the environmental profile indicates rain) pre-announcements may be deleted from the standard set of instructions 51. If the driver is susceptible to the time of day or the day of week (every missed instruction is listed in the profile with a timestamp, so a prediction can be done with this information), give more detailed instructions, such as a driver that is known to forget exits at night, in winter, or Friday afternoons. If the driver is on the phone, extra attention may be attracted by playing e.g. a sound. If the driver mistakes left for right, extra instructions may be given to emphasize left or right (e.g. "go right, short turn").

In an embodiment, the volume of the output instruction is increased if the driver profile indicates that the driver is making a phone call at the moment an output instruction is planned. Alternatively, the volume may be decreased, for example if the driver profile indicates that the driver never ignores/forgets exits or turns when the driver is making a phone call.

In an embodiment, the driver has the ability to disable the adaptive navigation instructions by manually selecting this in his user profile. Also, if the driver thinks the system is not treating him in the right way, there may be a possibility to reset the profile to the factory settings, resulting in a default friendly way of presenting instructions.

Figure 5:
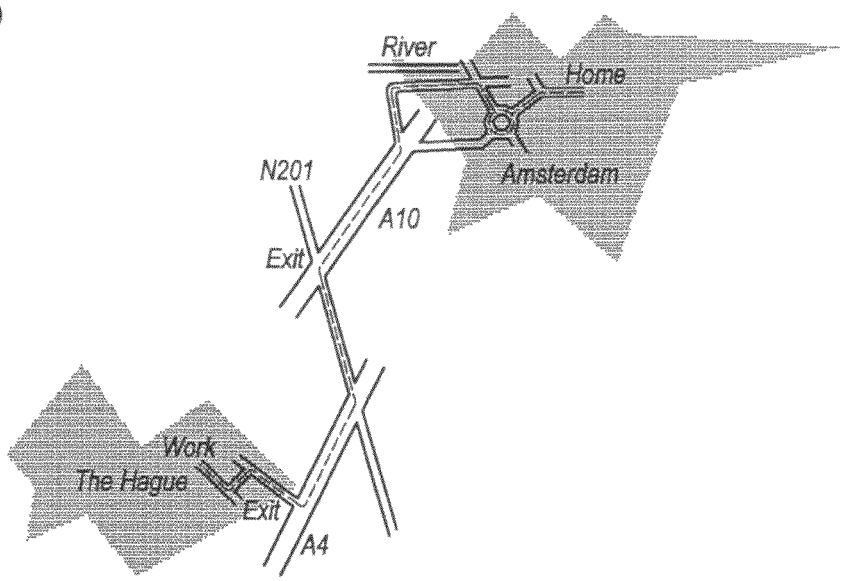
FIG. 5 shows an example of a route from Amsterdam to The Hague with two highway exits.

Below a series of simplified but detailed examples of the way the invention works is given with reference to FIGS. 5 and 6 and Table 1.

Table 1 shows an example of an excerpt of a driver profile of a driver named 'Phil', aged 58, male, living in Amsterdam, works in The Hague. Phil has initially never traveled the route Amsterdam-The Hague, which has 2 highway exits, the way back home has also 2 highway exits, see FIG. 5.

Scenario A: Instructions Near Home Location or Recent Destinations

The driver parameter "driver does not want navigation instructions in his own home location or recent location" for each destination will initially have a value 0, resulting in an "initial" set of output instructions for a calculated route. After driving to work for one week, the driver parameter will e.g. have a value of 5*5% a day=25. After one week of holiday the value may be reduced to 25−7*1% a day=18%. This value may climb up to 100 during an average working year. The routes to the predefined home location will be counted, as well as routes to recent destinations. Every destination has its own counter. New destinations will be added, having a counter of value 0.

The profile to instruction translator 48 may use the value of the parameter "driver does not want navigation instructions in his own home location or recent destination" to reduce the number of output instructions as compared to the initial set of output instructions.

A predefined limit of "driver does not want navigation instructions in his own home location" for the home location may be preset to 30%, so, as a result, the second work week will result in 43%, exceeding this limit. Thus, fewer instructions are generated when the driver enters the area of his home town. A map polygon that defines this area can be derived from the map data, as the polygon of the city of the destination and hometown are stored there. Instructions to be omitted may be for example "$3^{rd}$ exit" after the instruction "at the roundabout, turn left", or "you have reached your destination".

Should Phil take some more weeks off, then the value of the parameter "driver does not want navigation instructions in his own home location" may drop slowly below the limit and the instructions at home and at work will both be as initial, resulting in more instructions again.

Scenario B: Missing Exits

In this example, the factor "driver is susceptible to day of week" and "driver is susceptible to time of day" are both 0. The number of missed exits is initially 0. After driving to work for one week, Phil took 20 exits this period, and did not miss one. So, his score of missing exits is still 0%.

The next situation describes Phil, after a heavy Sunday night party, at the time of the next Monday morning. He missed the highway exit, although he must have heard the standard instructions. Now, as a result, the "driver is susceptible to day of week" parameter, as well as the "driver is susceptible to time of day" are both 100. He missed 1 out of 21 exits, which is a score of about 4%. If, the next morning, he misses the exit again, the "driver is susceptible to day of week" parameter is set to 64, and the parameter "driver is susceptible to time of day" stays 100. Also, he missed 2 out of 22 exits, which is a score of 9%. A predefined limit of 8% may exist here, which allows the algorithm to generate adaptive instructions against missed exits.

The instructions of Tuesday morning were the same as Monday, because the missed-exit score is was only 4% on Monday. No instructions were adapted.

The instructions of Wednesday morning will not be the same as Tuesday, because Phil missed 9% of the exits, which is more than the 8% limit. The parameter "driver is susceptible to time of day" is 100% while the predefined limit may be 50%, so extra instructions may be given, such as "ahead, take the exit", "after 100 meter, take the exit", "don't forget to take the exit here".

The instructions of the next Monday and Tuesday evening while driving home will be the same as this Wednesday morning, for the reason that this is a Monday or Tuesday, even though it is not a morning. Monday and Tuesday have both a score of 1 missed exits, which resulted in a "driver is susceptible to day of week" score of 64%. For the record, should Phil also miss an exit on Wednesday, then the "driver is susceptible to day of week" score drops to 47%. This results in no extra instructions for missed exits anymore.

Scenario C: Phil Drives Smoothly

In this example, Phil drives to his work for some time now. Aware of the petrol prices, he will accelerate his vehicle smoothly and will release his gas in time before braking. The acceleration is measured in $[m/s^2]$ between the period that the speed is 0 $[m/s]$ and the first time the speed is 90% of the maximum. This is stored as a moving average with a predefined number of samples, such as 100 consecutive samples. Phil drives smoothly from 0 to 50 $[km/h]$ in about 15 seconds, yielding a average acceleration of 0.93 $[m/s^2]$. This value is stored for the moving average algorithm. Thus, 100 samples can be stored, and when a new sample arrives, the oldest will be removed. The minimum limit for acceleration aggression may be 0.5 $[m/s^2]$ and the maximum limit may be 5.0 $[m/s^2]$. As this is the first sample, Phil's average is 0.93 now. Phil will have an acceleration aggression factor of $(0.93-0.5)/(5.0-0.5)$ =about 9%. When Phil feels like some speeding, he might go from 0 to 50 $[km/h]$ in 5 seconds, yielding in an acceleration of 2.8 $[m/s^2]$. His average is now about 1.85 $[m/s^2]$, yielding a new acceleration aggression parameter value of 30%.

For using the brakes, the same deceleration aggression factor is calculated and processed. The acceleration will be negative, but the processing of the values is the same as above acceleration aggression parameter. Here, it is assumed that Phil uses the brakes in the same way as his gas pedal, resulting in a deceleration aggression of 30%.

For curves, every curve of more than 30 degrees, the speed and curve radius is measured and converted to a centripetal acceleration in $[m/s^2]$ and also stored in a moving average. Phil saves on his maintenance cost concerning his rubber tyres by taking the curves smoothly. A roundabout with radius 70 $[m]$ (derived from the map data) is driven in Amsterdam driving 50 $[km/h]$. This results in a centripetal acceleration of 2.8 $[m/s^2]$. The minimum limit for acceleration aggression may be defined as 1 $[m/s^2]$ and the maximum limit may be defined as 10 $[m/s^2]$, so Phil has a curve aggression parameter value of $(2.8-1)/(10-1)=20\%$. Should he drive the same speed for a small roundabout of 35 $[m]$ radius, then he would have a score of 50%. Those values are stored in the moving average and can be consulted later.

The application of Phil's three aggression factors (acceleration, deceleration and curve acceleration moving average) is to classify the current driver as "smooth", "average" or "wild", depending on the average value of both factors. A lower band of the value for the aggression factor may be 0%-30% for smooth drivers, a mid band may be 30%-70% for "average" drivers and a higher band may be 70%-100% for "wild" drivers. Phil would be classified as a "smooth" driver with his 27% average of 30% acceleration aggression factor, 30% deceleration aggression and 20% curve acceleration aggression factor.

There are some exceptions, in which case Phil's average would not be affected. When the environmental profiler 46 indicates to the driver profiler 44 that current traffic conditions are "busy", or road conditions are "slippery", or weather conditions are "storm", the measured value may not processed. The reason behind this is that this is not a natural behaviour, but a behaviour, resulting from external impulses. When building up a personal driver profile, external impulses should have a minimum of impact on these values. Also, when GPS coverage and precision are below certain acceptable limits, the driver profile is not changed, as it may be expected that this "observed behaviour" is caused by a bad positioning error of the GPS receiver 23.

Finally, Phil's classification of "smooth driver" (i.e. a relatively low aggression factor) will lead to different navigation instructions as follows. As Phil does not like speeding or driving aggressively, he may want his instructions announced a number of times, in order to have time to react on these instructions. For example, the standard instruction to leave the highway "after 800 meters, take the exit" may be announced as "ahead, take the exit", "use the right lane for the exit" or "exit ahead, please slow down in time and choose the right lane". Also, when approaching a roundabout, Phil may be given the extra instruction "you can safely use the right lane" in addition to: "on the roundabout, turn left, $3^{rd}$ exit". Should Phil have a "average" classification, no instruction changes will apply. Should Phil drive according to the "wild" classification, he will get fewer instructions, as they may not be able to be spoken aloud in the short time between approaching and reaching a certain point for an instruction. Phil may need short and clear instructions like "go left after 100 meters", "roundabout, turn left" while driving "wild".

TABLE 1

Phil's profile after these scenarios

| | |
|---|---|
| acceleration aggression | 30% |
| deceleration aggression | 30% |
| curve acceleration aggression | 20% |
| average aggression | 27% |
| driver does not want navigation instructions in his own home location | 43% |
| % missed exits | 9% |
| driver is susceptible to day of week | 64% |
| driver is susceptible to time of day | 100% |

Scenario D: Phil Ignores a Certain Instruction at a Certain Place

Phil likes to drive along a river in his hometown, so when he navigates to some destination, he prefers the route that goes for some time along the river, if this does not take too much extra time. This means that every day, Phil ignores some navigation instructions at the same place again. It only takes a few minutes and some hundred meters extra. In the example, he drives to work and the suggested instruction is to go straight on at the roundabout, see FIG. 5. Phil likes the riverside route and goes right at the roundabout. The number of times of ignoring this particular instruction at this particular location is counted. When this number exceeds a certain predefined limit such as 10 times, the location is flagged to suggest that it has a reasonable alternative. This flagging will only take place when the extra time needed for the detour is less than a predefined limit of 10% extra time or extra distance. The next time Phil goes to work, he will get the same instructions on the screen, but they will not be spoken aloud when approaching the roundabout, as Phil will probably ignore them. He would only be annoyed by the instruction, as he has his personal preference for this small deviation.

According to an embodiment, each base instruction is converted into K output instructions with K>=0 and K depending on data in one or more of the profiles. If K=0, it means that a base instruction is deleted. If K=1, it means that a base instruction is converted into one output instruction. If K>1, it means that a base instruction is converted in one or more output instructions. This embodiment will now be discussed using an example. The example will be discussed with reference to FIG. 6 in which a route 80 is depicted from an origin A to a destination B within Amsterdam. The route 80 from A to B is calculated by the route calculation module 41 and sent to the instruction module 42 as a set of data, describing road vectors and coordinates. The instruction module 42 will use the set of data to produce a set of base instructions. In this example the set of base instructions may look like:

START
20 m RIGHT
300 m U-TURN
230 m RIGHT
900 m LEFT
150 m RIGHT
55 m RIGHT
75 m FINISH
STOP

Figure 6:
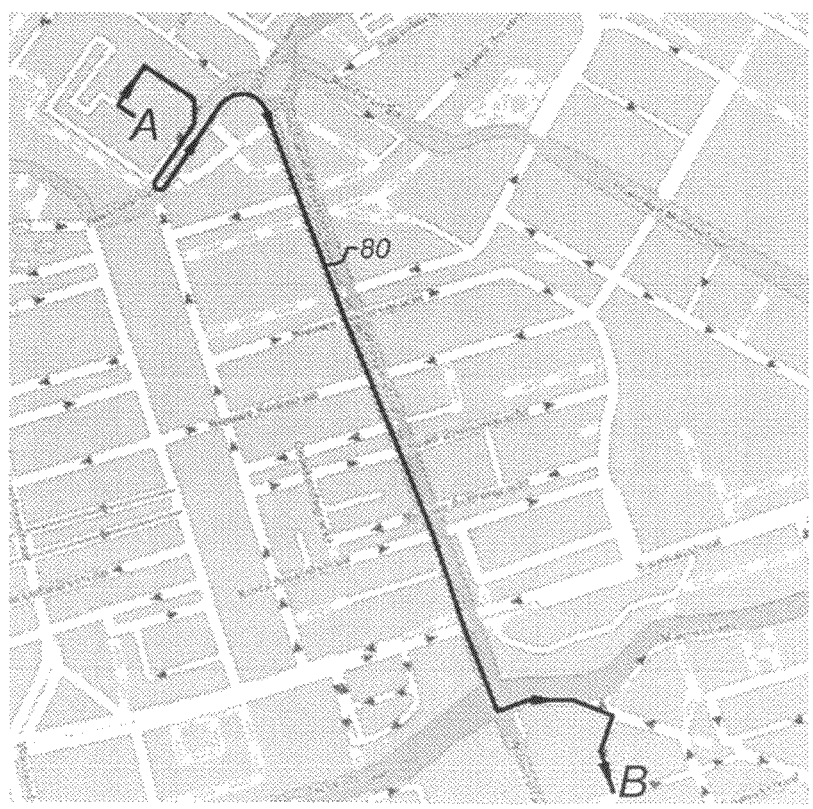
FIG. 6 shows an example of a route from an origin A to a destination B within Amsterdam.

This set of base instructions 51 is derived from the route 80 and map data, and does not contain human instructions, but more a shortest form of describing the route 80. The profile-to-instruction translator 48 will translate the base instructions to output instructions, see arrow 57 in FIG. 4. To translate (i.e. convert) the base instructions, possible human instructions stored in the database 70 are combined with the base instructions. In this example, the output instructions generated by the profile-to-instruction translator 48 over time, and dosed by keeping track of the distance driven, are at least:

turn right
make a U-turn
turn right
turn left
turn right
turn right
destination reached As can be seen at the top of FIG. 6, the route 80 immediately curves to the right without having an intersection. The driver may become confused about when there is no instruction for this turning. However, the navigation device 10 may not give output instructions for these "natural turns", as they exist in the base instructions "turn right" and "turn left". Depending on a drivers profile, also these natural turns may be indicated (K>1). Also additional (i.e. K>1) instructions can be given for drivers having for example a driver profile with a low aggression factor. As these drivers like to drive safely and probably want as many instructions as possible. Also driver having a relatively high age (e.g. age>60) or drivers who like to avoid risks (drivers that can be classified as "smooth" drivers). In this example, the output instructions may look like:

[now] turn right
[turn right here, follow the road]
[turn right again, just follow the road]
after 200 meter make a U-turn [then at the end of the road turn right]
[now] make a U-turn [then at the end of the road turn right]
at the end of the road turn right [then stay in the left lane]
[now] turn right [then stay in the left lane]
[left turn ahead]
after 200 meter turn left, then turn right
turn left [then turn right]
turn right [then turn right]
turn right [then you have reached your destination]
you have reached your destination Above, text between brackets is given to the driver who has a high value for the "percentage of exits ignored by the driver" parameter or a high value for the high "percentage of turns where driver mistook left for right or vice versa" parameter.

Extra instructions (K>1) for the driver who has an even higher value for the "percentage of exits ignored by the driver" parameter or an even higher value for the high "percentage of turns where driver mistook left for right or vice versa" parameter in their driver profile may be inserted:

[you have to] turn right [here]

Extra instructions for drivers who seem to confuse left and right which is indicated by a high (e.g. >80) value for the parameter "percentage of turns where driver mistook left for right or vice versa":

in Europe: turn right [this is a sharp turn]
in UK: turn right [this is a wide turn]
in Europe: turn left [this is a wide turn]
in UK: turn left [this is a sharp turn]

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein. It will be understood by a skilled person that all software components may also be formed as hardware components.

The descriptions above are intended to be illustrative, not limiting. Thus, it will be apparent to one skilled in the art that modifications may be made to the invention as described without departing from the scope of the claims set out below.

The invention claimed is:

1. A navigation device arranged to give navigation instructions to a driver of a vehicle, said navigation device comprising a computer processor configured to execute the following steps:
   determining a route from an origin to a destination;
   producing a set of base instructions for the driver to enable the driver to travel the determined route;
   recording at least one driving behavior parameter of said driver
   building up a driver profile using said at least one recorded driving behavior parameter;
   updating the built up driver profile when the driver is driving unless an exception occurs due to at least one of traffic and weather conditions;

converting the produced set of base instructions into a set of output instructions depending on said built up driver profile; and outputting the output instructions to the driver of the vehicle by way of one or more of an audio system and a display system.

2. The navigation device of claim 1, wherein a plurality of driver profiles are stored on said navigation device, each driver profile being associated with a different driver.

3. The navigation device of claim 2, wherein the computer processor is further configured to execute the steps of recognizing the driver of the vehicle, and selecting the stored driver profile associated with the recognized driver.

4. The navigation device of claim 1, wherein said at least one driving behavior parameter comprises data indicative of a degree of aggression of said driver, the degree of aggression being based on at least one of:

a measured acceleration of the vehicle; a measured deceleration of the vehicle;

and a curve acceleration during a curve.

5. The navigation device of claim 4, wherein said data indicative of a degree of aggression of said driver comprises at least one of: an acceleration factor equal to a moving average of an acceleration of the vehicle divided by a predefined maximum acceleration; a deceleration factor equal to a moving average of a deceleration in of the vehicle divided by a predefined maximum deceleration; and a curve aggression factor equal to a moving average of a curve acceleration during a curve divided by a predefined maximum curve acceleration.

6. The navigation device of claim 1, wherein said driver profile is built up by adapting a preset driver profile.

7. The navigation device of claim 1, wherein said driver profile comprises at least one of: home address, driver ID, date of birth, for a plurality of predefined areas, the number of times an administrative area has been visited, number of times certain destinations are driven, percentage of exits ignored by driver, percentage of turns where driver mistook left for right or vice versa, degree of aggression, mobile phone number, driver is making a phone call at the moment at least one of the set of output instructions is planned for the near future, difficulty level of the driving conditions, driver does not want navigation instructions in his own home location or recent destination, arranged for each destination, drivers susceptibility to the current day of week, and drivers susceptibility to the time of day.

8. The navigation device claim 1, wherein said step of converting comprises converting each base instruction out of said produced set of base instructions into K output instructions, wherein K is an integer value larger than or equal to zero, depending on data in said at least one built up driver profile.

9. The navigation device of claim 1, wherein said step of converting comprises determining at least one of: (i) a voice used to utter at least one of the set of output instructions; (ii) a volume used to utter at least one of the set of output instructions; (iii) a timing of the set of output instructions; and (iv) a distance between a point at which at least one of the set of output instructions is given and a point of the route associated with the at least one of the set of output instructions, depending on said at least one built up driver profile.

10. The navigation device of claim 1, wherein the set of base instructions does not comprise human instructions and the output instructions comprise human instructions.

11. A non-transitory data carrier, comprising a computer program which, when executed on a processor of a navigation device, causes the navigation device to perform a method comprising:

determining a route from an origin to a destination:

producing a set of base instructions for driver to enable the driver to travel the determined route:

recording at least one driving behavior parameter of said driver;

building up a driver profile using said at least one recorded driving behavior parameter, and storing said built up driver profile on said navigation device;

updating the built up driver profile when the driver is driving unless an exception occurs due to at least on of traffic and weather conditions;

converting the produced set of base instructions into a set of output instructions depending on said built up driver profile; and outputting the output instructions to the driver of the vehicle.

12. A method for providing navigation directions using a navigation device located in a vehicle, the navigation device comprising a computer processor, the method comprising:

determining, by the computer processor, a route from an origin to a destination;

producing, by the computer processor, a set of base instructions for the driver to enable the driver to travel the determined route;

recording, by the computer processor, at least one driving behavior parameter of said driver building up, by the computer processor, a driver profile using said at least one recorded driving behavior parameter, and storing said built up driver profile on said navigation device;

updating, by the computer processor, the built up driver profile when the driver is driving unless an exception occurs due to at least one of traffic and weather conditions;

converting, by the computer processor, the produced set of base instructions into a set of output instructions depending on said built up driver profile; and outputting the output instructions to the driver of the vehicle by way of one or more of an audio system and a display system.

* * * * *